United States Patent
Takagi et al.

(10) Patent No.: US 10,894,649 B2
(45) Date of Patent: Jan. 19, 2021

(54) BARRIER PLUG AND CONTAINER WITH BARRIER PLUG

(71) Applicant: Hosokawa Yoko Co., LTD., Tokyo (JP)

(72) Inventors: Naoki Takagi, Tokyo (JP); Kaoru Takasu, Tokyo (JP); Toru Ichikawa, Tokyo (JP); Takayuki Kotani, Tokyo (JP); Tomonari Shinohara, Tokyo (JP)

(73) Assignee: Hosokawa Yoko Co., LTD., Tokyo (JP)

( * ) Notice: Subject to any disclaimer, the term of this patent is extended or adjusted under 35 U.S.C. 154(b) by 200 days.

(21) Appl. No.: 16/075,237

(22) PCT Filed: Feb. 3, 2017

(86) PCT No.: PCT/JP2017/004101
§ 371 (c)(1),
(2) Date: Aug. 3, 2018

(87) PCT Pub. No.: WO2017/135450
PCT Pub. Date: Aug. 10, 2017

(65) Prior Publication Data
US 2019/0039800 A1 Feb. 7, 2019

(30) Foreign Application Priority Data

Feb. 5, 2016 (JP) .................................. 2016-021242

(51) Int. Cl.
*B65D 75/58* (2006.01)
*B32B 7/02* (2019.01)
(Continued)

(52) U.S. Cl.
CPC ............ *B65D 75/5883* (2013.01); *B32B 1/04* (2013.01); *B32B 7/02* (2013.01); *B32B 7/12* (2013.01);
(Continued)

(58) Field of Classification Search
CPC .... B65D 75/5883; B65D 65/40; B65D 75/58; B32B 7/02; B32B 27/30; B32B 27/32;
(Continued)

(56) References Cited

U.S. PATENT DOCUMENTS 5,084,500 A * 1/1992 Yamada ................. B32B 27/30
524/417
2006/0233980 A1 10/2006 Andersson et al.
(Continued)

FOREIGN PATENT DOCUMENTS

EP 3412593 A1 12/2018
JP 2001-213455 A 8/2001
(Continued)

OTHER PUBLICATIONS

International Preliminary Report on Patentability and Written Opinion issued in PCT/JP2017/004101 dated Aug. 7, 2018 and English Translation (12 pages).
International Search Report for PCT/JP2017/004101 dated May 9, 2017; English translation submitted herewith (6 pages).

*Primary Examiner* — Michael C Miggins
(74) *Attorney, Agent, or Firm* — Fitch, Even, Tabin & Flannery LLP

(57) ABSTRACT

A barrier plug having a spout body to be attached to a container, and a cylindrical molded article inserted into the spout body, wherein the cylindrical molded article has a resin layer having a barrier resin, an oxygen transmission rate of the resin layer is 10000 mL·μm/m²·24 hrs·MPa (23° C. and 65% RH) or less, a water vapor transmission rate of the resin layer is 1000 g·μm/m²·24 hrs (38° C. and 90% RH) or less, and the cylindrical molded article forms a discharge flow path for discharging contents in the container to an outside.

8 Claims, 3 Drawing Sheets

(51) Int. Cl.
    *B32B 27/30*     (2006.01)
    *B32B 27/32*     (2006.01)
    *B32B 1/04*      (2006.01)
    *B65D 65/40*     (2006.01)
    *B32B 27/08*     (2006.01)
    *B32B 7/12*      (2006.01)

(52) U.S. Cl.
    CPC .............. *B32B 27/08* (2013.01); *B32B 27/30* (2013.01); *B32B 27/32* (2013.01); *B65D 65/40* (2013.01); *B65D 75/58* (2013.01); *B32B 2262/0253* (2013.01); *B32B 2307/31* (2013.01); *B32B 2307/732* (2013.01)

(58) Field of Classification Search
    CPC .. B32B 1/04; B32B 27/08; B32B 7/12; B32B 2262/0253; B32B 2307/31; B32B 2307/732
    See application file for complete search history.

(56) References Cited

U.S. PATENT DOCUMENTS

2009/0008416 A1* 1/2009 Kurosawa ......... B29C 45/14598
                                                          222/566
2017/0008207 A1    1/2017 Tamarindo

FOREIGN PATENT DOCUMENTS

| JP | 2003-095288 A | 4/2003 |
| JP | 2006-001623 A | 1/2006 |
| JP | 2006-103751 A | 4/2006 |
| JP | 2007-238104 A | 9/2007 |
| JP | 2008-087786 A | 4/2008 |
| JP | 2009-292492 A | 12/2009 |
| JP | 2012-162272 A | 8/2012 |
| JP | 2015-036215 A | 2/2015 |
| JP | 2016-084166 A | 5/2016 |
| WO | 2015/125071 A1 | 8/2015 |

* cited by examiner

BARRIER PLUG AND CONTAINER WITH BARRIER PLUG

CROSS-REFERENCE TO RELATED APPLICATIONS

This application is a U.S. national phase application filed under 35 U.S.C. § 371 of International Application PCT/JP2017/004101, filed Feb. 3, 2017, designating the United States, which claims priority from Japanese Application Number 2016-021242, filed Feb. 5, 2016.

FIELD OF THE INVENTION

The present invention relates to a barrier plug and a container with a barrier plug.

BACKGROUND OF THE INVENTION

Conventionally, plastic soft packaging bags in various forms are developed, and packaging products, in which various foods and drinks, for example, baby foods, liquid foods, infusion bags, juices, jelly-like drinks, nutritional drinks, drinking water, teas, coffee drinks, milk, seasonings, oils, cosmetics, and others, are filled and packaged, are sold. Particularly, in recent years, for the above plastic soft packaging bags in various forms such as self-supporting bags, gadget type bags, and others, packaging products obtained by attaching a plug to an opening at one side of the bag body, and the like have also been proposed because of their convenience. These packaging products are referred to as pouches with spouts, or the like, are easy to handle, also have resealability and the like, and are in increasing demand.

However, depending on the contents, many contents deteriorate due to oxygen, water, and the like, and using, as films constituting these bags and containers, laminated materials whose gas barrier properties against oxygen and water vapor are improved by the lamination of aluminum foil, or the formation of barrier layers by coating (vapor deposition) with silicon oxide, diamond-like carbon, or the like is often seen.

On the other hand, some containers containing drugs or the like, such as infusion bags, are also provided with plugs. In bags and containers using packaging materials (films) provided with these barrier layers in this manner, the entire barrier properties can be improved, but in the plug provided in these bags and containers, measures for gas barrier property improvement are not taken, and therefore for most gas transmission to the contents, the influence of these plugs is strong, which is not negligible in the suppression of the deterioration of the contents. For these problems, many measures for suppressing deterioration due to gas transmission and enhancing the storage properties are proposed (for example, see Patent Literatures 1 to 3).

CITATION LIST

Patent Literature

Patent Literature 1: Japanese Patent Laid-Open No. 2012-162272
Patent Literature 2: Japanese Patent Laid-Open No. 2009-292492
Patent Literature 3: Japanese Patent Laid-Open No. 2006-1623

SUMMARY OF INVENTION

However, problems of conventional cylindrical molded articles such as plugs are that the oxygen barrier properties decrease in the case of storage under high humidity, and the water vapor barrier properties, and the oxygen barrier properties when hot water treatment such as boiling or retorting is performed decrease.

In order to solve the problem of the decrease in oxygen barrier properties under high humidity, attaching a winding of a vapor-deposited film or the like resistant to humidity to the cylindrical portion of a plug and injection-molding it is also considered. However, in this case, the problem of gas intrusion from an adhesive layer and a butt seam sealing portion in winding, and the problem of the cracking of the vapor-deposited layer in winding arise anew. Further, the problem of the transmission and leakage of the smell of contents arises.

The present invention has been made in view of the above problems, and it is an object of the present invention to provide a barrier plug excellent in room temperature storage properties and high temperature and high humidity storage properties and excellent in smell retention properties for smelling substances, and a container with a barrier plug comprising the barrier plug.

"Room temperature storage properties": little deterioration of the contents, for example, in the case of storage at 23° C. and 50% RH for 3 days.

"High temperature and high humidity storage properties": little deterioration of the contents, for example, in the case of storage at 40° C. and 90% RH for 3 days.

Solution to Problem

The present inventors have studied diligently in order to solve the above problems, and as a result found that the above problems can be solved by using a cylindrical barrier material having a balance of both the oxygen transmission rate and the water vapor transmission rate, leading to the completion of the present invention.

Specifically, the present invention is as follows.

[1]

A barrier plug comprising a spout body to be attached to a container, and a cylindrical molded article inserted into the spout body, wherein the cylindrical molded article has a resin layer comprising a barrier resin, an oxygen transmission rate of the resin layer is 10000 mL·µm/m$^2$·24 hrs·MPa (23° C. and 65% RH) or less, a water vapor transmission rate of the resin layer is 1000 g·µm/m$^2$·24 hrs (38° C. and 90% RH) or less, and the cylindrical molded article forms a discharge flow path for discharging contents in the container to an outside.

[2]

The barrier plug according to [1], wherein the spout body comprises a polyolefin-based resin.

[3]

The barrier plug according to [1] or [2], wherein a melting point of the barrier resin is higher than a melting point of the polyolefin-based resin.

[4]

The barrier plug according to any one of [1] to [3], wherein the spout body comprises a covering layer covering at least part of an end surface of the cylindrical molded article at an end opposite to an end to be attached to the container, and the covering layer covers an end surface of the resin layer comprising the barrier resin.

[5]

The barrier plug according to any one of [1] to [4], wherein the barrier resin comprises a vinylidene chloride copolymer.

[6]

The barrier plug according to any one of [1] to [5], wherein the cylindrical molded article comprises an inside layer and an outside layer,
the inside layer comprises a polyolefin-based resin, and
the outside layer is the resin layer.

[7]

The barrier plug according to any one of [1] to [5], wherein the cylindrical molded article comprises an inside layer, one or more intermediate layers, and an outside layer,
the inside layer comprises a polyolefin-based resin, and
the outside layer and/or the intermediate layer are the resin layer.

[8]

A container with a barrier plug, comprising a container and the barrier plug according to any one of [1] to [7] attached to the container, wherein
the container comprises at least one or more selected from the group consisting of a laminated film having a resin layer composed of a barrier resin having an oxygen transmission rate of 10000 mL·µm/m$^2$·24 hrs·MPa (23° C. and 65% RH) or less and a water vapor transmission rate of 1000 g·µm/m$^2$·24 hrs (38° C. and 90% RH) or less, a laminated film having an aluminum foil layer, and a metal vapor-deposited film.

According to the present invention, it is possible to provide a barrier plug excellent in water vapor barrier properties and oxygen barrier properties and excellent in smell retention properties for smelling substances, and a container with a barrier plug comprising the barrier plug.

DESCRIPTION OF EMBODIMENTS

An embodiment of the present invention (hereinafter referred to as "the present embodiment") will be described in detail below, but the present invention is not limited to this, and various modifications can be made without departing from the spirit thereof.

[Barrier Plug]

The barrier plug in the present embodiment comprises a spout body to be attached to a container, and a cylindrical molded article inserted into the spout body, wherein the cylindrical molded article comprises a resin layer comprising a barrier resin, the oxygen transmission rate of the above resin layer is 10000 mL·µm/m$^2$·24 hrs·MPa (23° C. and 65% RH) or less, the water vapor transmission rate of the above resin layer is 1000 g·µm/m$^2$·24 hrs (38° C. and 90% RH) or less, and the above cylindrical molded article forms a discharge flow path for discharging the contents in the above container to the outside.

Figure 1:
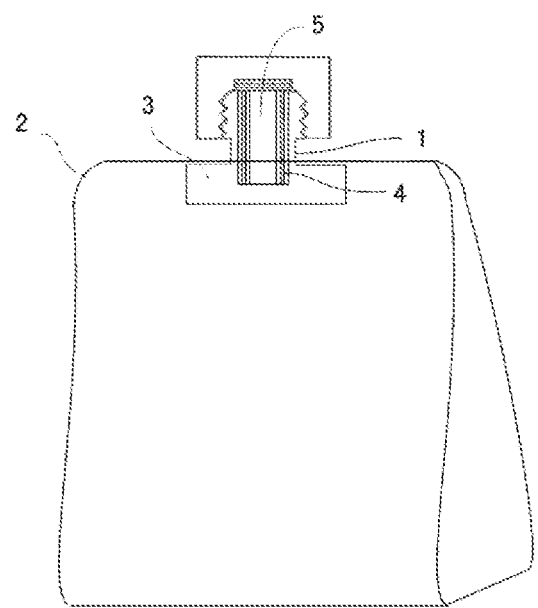
FIG. 1 shows a schematic view showing a specific example of a barrier plug and a container with a barrier plug comprising the barrier plug in the present embodiment.

A schematic view showing a specific example of the barrier plug and a container with a barrier plug comprising the barrier plug in the present embodiment is shown in FIG. 1. The barrier plug in the present embodiment can be used for a container containing a food or the like, and can be used as a plug for a container of which water vapor barrier properties and oxygen barrier properties are required, also for a product other than a food or the like.

The "container containing a food or the like" is not particularly limited, and examples thereof include containers with plugs such as pouches with spouts including Cheer Pack (R), bags with plugs such as bag-in-box bag bodies or infusion bags, and bottles with plugs in which drinks, jellies, seasonings such as soy sauce, or the like are enclosed. Problems of conventional plugs are that they have poor oxygen barrier properties and/or water vapor barrier properties, and therefore even if containers themselves containing foods or the like have oxygen barrier properties and water vapor barrier properties, oxygen and water vapor passing through the plugs deteriorate the contents of the packaging, and conversely, the components in the contents of the packaging are released to the outside through the plugs. Additionally, in a food packaging step, from the viewpoint of sterilization and disinfection, a food to be packaged is enclosed in a container in a heated state, or a container in which a food is enclosed is heated. However, a problem is that when the plug is exposed to water vapor produced from the food or the like in the food packaging step, the barrier properties decrease further.

In contrast to this, by comprising a predetermined cylindrical molded article, the barrier plug in the present embodiment can prevent the deterioration of a food, a drink, a drug, or the like in a packaging that dislikes the intrusion of gases such as oxygen and water vapor, and can allow long-term storage while keeping hygiene and safety. Particularly, the barrier plug in the present embodiment can maintain barrier properties even if hot water treatment such as boiling or retort treatment is performed.

[Spout Body]

The resin constituting the spout body is not particularly limited, and examples thereof include a polyethylene-based resin (hereinafter also referred to as "PE") such as low density polyethylene, medium density polyethylene, high density polyethylene, or ethylene-α-olefin; a polypropylene-based resin (hereinafter also referred to as "PP") such as a homopolymer or a copolymer such as a random copolymer or a block copolymer; an ethylene-vinyl acetate copolymer (hereinafter abbreviated as EVA); a polyamide-based resin (hereinafter also referred to as "PA"); and an adhesive resin. Among these, polyolefin-based resins such as a polyethylene-based resin, a polypropylene-based resin, and an ethylene-vinyl acetate copolymer are preferred. By using a polyolefin-based resin, the moldability tends to improve more. One resin constituting the spout body may be used alone, or two or more resins constituting the spout body may be used in combination.

[Cylindrical Molded Article]

The cylindrical molded article is to be inserted into the spout body, and the inserted cylindrical molded article forms a discharge flow path for discharging the contents in a container to the outside. The cylindrical molded article has a resin layer comprising a barrier resin, the oxygen transmission rate of the resin layer is 10000 mL·µm/m$^2$·24 hrs·MPa (23° C. and 65% RH) or less, and the water vapor transmission rate of the resin layer is 1000 g·µm/m$^2$·24 hrs (38° C. and 90% RH) or less. "RH" means relative humidity. In addition, the "cylindrical molded article" is not particularly limited as long as it comprises a cylindrically molded resin layer comprising a barrier resin.

[Resin Layer]

The oxygen transmission rate of the resin layer at 23° C. and 65% RH is preferably 10000 mL·μm/m²·24 hrs·MPa or less, more preferably 800 mL·μm/m²·24 hrs·MPa or less, further preferably 500 mL·μm/m²·24 hrs·MPa or less, still further preferably 450 mL·μm/m²·24 hrs·MPa or less, still more preferably 350 mL·μm/m²·24 hrs·MPa or less, particularly preferably 300 mL·μm/m²·24 hrs·MPa or less, and most preferably 250 mL·μm/m²·24 hrs·MPa or less. The lower limit of the oxygen transmission rate of the resin layer at 23° C. and 65% RH is not particularly limited and is 0 mL·μm/m²·24 hrs·MPa. As used herein, "RH" means relative humidity.

When the oxygen transmission rate of the resin layer at 23° C. and 65% RH is 10000 mL·μm/m²·24 hrs·MPa or less, the suppression of the deterioration of contents, and the property of keeping the freshness of contents tend to improve more. The oxygen transmission rate of the resin layer at 23° C. and 65% RH can be decreased by selecting a resin layer having better barrier properties, and specifically, by using a vinylidene chloride copolymer, the oxygen transmission rate can be significantly decreased, but this is not limiting. The oxygen transmission rate of the resin layer at 23° C. and 65% RH can be measured by a method described in Examples. Here, the "resin having barrier properties" is not particularly limited, and examples thereof include ethylene-vinyl alcohol copolymers, polyamide-based resins, polychlorotrifluoroethylene-based resins, and polyacrylonitrile-based resins.

The water vapor transmission rate of the resin layer at 38° C. and 90% RH is preferably 1000 g·μm/m²·24 hrs or less, more preferably 500 g·μm/m²·24 hrs or less, further preferably 300 g·μm/m²·24 hrs or less, still further preferably 200 g·μm/m²·24 hrs or less, still more preferably 100 g·μm/m²·24 hrs or less, particularly preferably 50 g·μm/m²·24 hrs or less, and most preferably 25 g·μm/m²·24 hrs or less. The lower limit of the water vapor transmission rate of the resin layer at 38° C. and 90% RH is not particularly limited and is 0 g·μm/m²·24 hrs.

When the water vapor transmission rate of the resin layer at 38° C. and 90% RH is 1000 g·μm/m²·24 hrs or less, the suppression of the deterioration of contents, and the property of keeping the freshness of contents tend to improve more. The water vapor transmission rate of the resin layer at 38° C. and 90% RH can be decreased by selecting a resin layer having better barrier properties, and specifically, by using a vinylidene chloride copolymer, the water vapor transmission rate can be significantly decreased, but this is not limiting. The water vapor transmission rate of the resin layer at 38° C. and 90% RH can be measured by a method described in Examples.

A numerical value obtained by dividing the oxygen transmission rate of the resin layer at 23° C. and 65% RH by the oxygen transmission rate at 23° C. and a high humidity of 90% RH and multiplying the quotient by 100 was evaluated as the rate of decrease in the oxygen transmission rate, and the rate of decrease in the oxygen transmission rate of the resin layer without the deterioration of oxygen barrier properties due to humidity is defined as 100%. The rate of decrease in the oxygen transmission rate is preferably 80 to 100%, more preferably 90 to 100%, and further preferably 95 to 100%. In the step of packaging contents in a container, from the viewpoint of sterilization and disinfection, contents to be packaged are enclosed in a container in a heated state, or a container in which a food is enclosed is heated. When the rate of decrease in the oxygen transmission rate is within the above range, a decrease in barrier properties such as the oxygen transmission rate tends to be able to be more suppressed also in such a case. The rate of decrease in the oxygen transmission rate can be controlled by the selection of a resin, and specifically, by using a vinylidene chloride copolymer, the oxygen transmission rate can be significantly decreased.

The thickness of the resin layer is preferably 5 to 1500 μm, more preferably 10 to 1000 μm, further preferably 25 to 700 μm, and particularly preferably 50 to 500 μm. When the thickness of the resin layer is within the above range, the cylindrical molded article can be used for more applications.

The thickness of the cylindrical molded article is preferably 5 to 1500 μm, more preferably 50 to 1000 μm, further preferably 75 to 700 μm, and particularly preferably 100 to 600 μm. When the thickness of the cylindrical molded article is within the above range, the cylindrical molded article can be used for more applications.

The inner diameter of the cylindrical molded article can be appropriately adjusted according to its application, is not particularly limited, and may be a diameter of 1 to 100 mm, or a diameter of 100 mm or more depending on the large container. For example, in the case of a bag and a container with a barrier plug characterized by being equipped with a barrier plug and sealed, those in which the inner diameter of the cylindrical molded article is 5 mm to 15 mm, and the thickness of the cylindrical molded article is 0.3 mm to 2 mm are preferred. The barrier plug can be manufactured by subjecting the cylindrical molded article to insert injection molding or the like with respect to a body.

(Barrier Resin)

The resin layer comprises a barrier resin, and the resin layer is preferably composed of a barrier resin. The barrier resin is not particularly limited, and examples thereof include vinylidene chloride copolymers, vinylidene chloride homopolymers, ethylene-vinyl alcohol copolymers, polyamide-based resins, polychlorotrifluoroethylene-based resins, and polyacrylonitrile-based resins. By using such a barrier resin, the water vapor non-transmission properties and the oxygen non-transmission properties tend to improve more. Among these, the resin layer preferably comprises a vinylidene chloride copolymer as the barrier resin, and the barrier resin is preferably composed of a vinylidene chloride copolymer. Advantages of a vinylidene chloride copolymer are that it is excellent in water vapor non-transmission properties, and further a decrease in oxygen non-transmission properties due to moisture absorption is also less likely to occur. In addition, the cylindrical molded article in the present embodiment may have a first resin layer comprising a barrier resin, and a second resin layer comprising a barrier resin having a composition different from that of the first resin layer. One barrier resin may be used alone, or two or more barrier resins may be used in combination.

The melting point of the barrier resin is preferably higher than the melting point of the resin constituting the spout body Thus, when the resin constituting the spout body is melted and injection-molded on the outer periphery of the cylindrical molded article in a method for manufacturing the barrier plug described later, the cylindrical molded article can be prevented from deforming due to the influence of the heat of the molten resin.

(Vinylidene Chloride Copolymer)

A vinylidene chloride copolymer is a copolymer of a vinylidene chloride monomer and a monomer copolymerizable with the vinylidene chloride monomer. The monomer copolymerizable with the vinylidene chloride monomer is not particularly limited, and examples thereof include vinyl chloride; acrylates such as methyl acrylate and butyl acrylate; acrylic acid; methacrylates such as methyl methacrylate and butyl methacrylate; methacrylic acid; methylacrylonitrile; and vinyl acetate. Among these, methyl acrylate and methylacrylonitrile are preferred from the viewpoint of the balance between water vapor non-transmission properties and oxygen non-transmission properties and extrusion processability. One of these copolymerizable monomers may be used alone, or two or more of these copolymerizable monomers may be used in combination.

The comonomer content of a vinylidene chloride-acrylate copolymer, a vinylidene chloride-methacrylate copolymer, and a vinylidene chloride-methylacrylonitrile copolymer is preferably 1 to 35% by mass, more preferably 1 to 25% by mass, further preferably 2 to 15.5% by mass, still further preferably 2 to 10% by mass, still more preferably 4 to 10% by mass, and particularly preferably 5 to 8% by mass. When the comonomer content of the vinylidene chloride copolymer is 1% by mass or more, the melting properties during extrusion tend to improve more. In addition, when the comonomer content of the vinylidene chloride copolymer is 35% by mass or less, the water vapor non-transmission properties and the oxygen non-transmission properties tend to improve more.

Furthermore, the comonomer (vinyl chloride) content of a vinylidene chloride-vinyl chloride copolymer is preferably 1 to 40% by mass, more preferably 1 to 30% by mass, further preferably 1 to 21% by mass, still further preferably 3.5 to 18.5% by mass, still more preferably 6 to 16% by mass, and particularly preferably 8.5 to 13.5% by mass. When the comonomer content of the vinylidene chloride copolymer is 1% by mass or more, the melting properties during extrusion tend to improve more. In addition, when the comonomer content of the vinylidene chloride copolymer is 40% by mass or less, the water vapor non-transmission properties and the oxygen non-transmission properties tend to improve more.

The weight average molecular weight (Mw) of the vinylidene chloride copolymer is preferably 50,000 to 150,000, more preferably 60,000 to 130,000, and further preferably 70,000 to 100,000. When the weight average molecular weight (Mw) is 50,000 or more, the melt tension required for molding tends to improve more. In addition, when the weight average molecular weight (Mw) is 150,000 or less, melt extrusion in which thermal stability is maintained tends to be possible. In the present embodiment, the weight average molecular weight (Mw) can be obtained by a gel permeation chromatography method (GPC method) using a standard polystyrene calibration curve.

(Polyolefin-Based Resin)

The polyolefin-based resin is not particularly limited, and examples thereof include polyethylene, polypropylene, ethylene-α-olefin copolymers, and ethylene-vinyl acetate copolymers.

The polyethylene is not particularly limited, and examples thereof include low density polyethylene having a density of 0.910 to 0.930 g/cm$^3$ and high density polyethylene having a density of 0.942 g/cm$^3$ or more. Moreover, the polypropylene is not particularly limited, and examples thereof include homopolypropylene and random polypropylene.

The comonomer (vinyl alcohol) content of an ethylene-vinyl alcohol copolymer is preferably 35 to 60 mol %, more preferably 38 to 58 mol %, further preferably 38 to 54 mol %, still further preferably 39 to 49 mol %, and particularly preferably 41.5 to 46.5 mol %. When the comonomer content is within the above range, the oxygen non-transmission properties tend to improve more. In addition, the degree of saponification of the ethylene-vinyl alcohol copolymer is preferably 98 to 100 mol %, more preferably 99 to 100 mol %. When the degree of saponification is within the above range, the oxygen non-transmission properties tend to improve more.

The content of vinyl acetate in the ethylene-vinyl acetate copolymer is preferably 1 to 35% by mass, more preferably 5 to 30% by mass, further preferably 10 to 25% by mass, and particularly preferably 15 to 20% by mass based on 100% by mass of the ethylene-vinyl acetate copolymer. When the content of vinyl acetate is within the above range, the interlayer adhesive strength tends to improve more in the case of a multilayer configuration.

The content of vinyl alcohol in the ethylene-vinyl alcohol copolymer (polyvinyl alcohol) is preferably 25 to 60% by mass, more preferably 30 to 55% by mass, further preferably 35 to 50% by mass, and particularly preferably 40 to 45% by mass based on 100% by mass of the ethylene-vinyl alcohol copolymer. When the content of vinyl alcohol is within the above range, the rate of decrease in the oxygen transmission rate tends to decrease more.

(Polyamide-Based Resin)

The polyamide-based resin is not particularly limited, and examples thereof include polycaproamide (nylon 6), polydodecanamide (nylon 12), polytetramethylene adipamide (nylon 46), polyhexamethylene adipamide (nylon 66), polyundecamethylene adipamide (nylon 116), polymetaxylylene adipamide (nylon MXD6), polyparaxylylene adipamide (nylon PXD6), polytetramethylene sebacamide (nylon 410), polyhexamethylene sebacamide (nylon 610), polydecamethylene adipamide (nylon 106), polydecamethylene sebacamide (nylon 1010), polyhexamethylene dodecamide (nylon 612), polydecamethylene dodecamide (nylon 1012), polyhexamethylene isophthalamide (nylon 6I), polytetramethylene terephthalamide (nylon 4T), polypentamethylene terephthalamide (nylon 5T), poly-2-methylpentamethylene terephthalamide (nylon M-5T), polyhexamethylene hexahydroterephthalamide (nylon 6T (H)) polynonamethylene terephthalamide (nylon 9T), polydecamethylene terephthalamide (nylon 10T), polyundecamethylene terephthalamide (nylon 11T), polydodecamethylene terephthalamide (nylon 12T), polybis(3-methyl-4-aminohexyl)methane terephthalamide (nylon PACMT), polybis(3-methyl-4-aminohexyl)methane isophthalamide (nylon PACMI), polybis(3-methyl-4-aminohexyl)methane dodecamide (nylon PACM12), and polybis(3-methyl-4-aminohexyl)methane tetradecamide (nylon PACM14). Among these, partially aromatic polyamides such as polymetaxylylene adipamide (nylon MXD6) are preferred from the viewpoint of oxygen barrier properties.

(Other Additives)

The resin layer may comprise other additives such as a known plasticizer, heat stabilizer, colorant, organic lubricant, inorganic lubricant, surfactant, and processing aid as required.

The plasticizer is not particularly limited, and examples thereof include acetyl tributyl citrate, acetylated monoglycerides, and dibutyl sebacate.

The heat stabilizer is not particularly limited, and examples thereof include epoxidized vegetable oils such as epoxidized soybean oil and epoxidized linseed oil, epoxy-based resins, magnesium oxide, and hydrotalcite.

[Layer Structure]

The cylindrical molded article may have a single-layer structure of a resin layer comprising a barrier resin, or may have a two-layer structure having an inside layer and an outside layer, or a three- or more-layer structure having an inside layer, one or more intermediate layers, and an outside layer, according to the application. When the cylindrical molded article has a two-layer structure, it is preferred that the inside layer comprises a polyolefin-based resin, and the outside layer is the above resin layer. In addition, when the cylindrical molded article has a three-layer structure, it is preferred that the inside layer comprise a polyolefin-based resin, and the outside layer and/or the above intermediate layer be the above resin layers. By having such a configuration, the cylindrical molded article is easily attached to a bag or a container.

The resin constituting the layer other than the resin layer comprising the barrier resin is not particularly limited, and examples thereof include a polyethylene-based resin (hereinafter also referred to as "PE") such as low density polyethylene, medium density polyethylene, high density polyethylene, or ethylene-α-olefin; a polypropylene-based resin (hereinafter also referred to as "PP") such as a homo or a copolymer such as a random copolymer or a block copolymer, or other copolymers; an ethylene-vinyl acetate copolymer (hereinafter also referred to as "EVA"); a polyamide-based resin (hereinafter also referred to as "PA"); and an adhesive resin. In addition, the layer other than the resin layer comprising the barrier resin may comprise other components such as an adhesive.

The layer configuration of a cylindrical molded article having a two- or more-layer structure is not particularly limited, and examples thereof include PE/PVDC/PE, PE/PVDC, PVDC/PE, PP/PVDC/PP, PP/PVDC, PVDC/PP, PP/EVA/PVDC/EVA/PVDC, PVDC/EVA/PVDC/EVA/PE, PE/EVA/PVDC, PVDC/EVA/PE, PP/adhesive resin/PVDC/adhesive resin/PP, PP/adhesive resin/PVDC, PVDC/adhesive resin/PP, PE/EVA/PVDC/EVA/PE, PE/adhesive resin/PVDC, and PE/adhesive resin/PVDC/adhesive resin/PE. The expression "PE/PVDC" indicates that a PE layer and a PVDC layer are laminated from the inside of the cylindrical molded article toward the outside.

[Lid Portion]

The barrier plug may have a lid portion covering a mouth of the plug. The portion of the lid portion covering the mouth of the plug preferably comprises a barrier resin, and other portions of the lid portion may comprise a barrier resin or the same resin as illustrated for the spout body.

[Method for Manufacturing Cylindrical Molded Article]

The cylindrical molded article in the present embodiment can be manufactured by a molding method such as extrusion processing, injection molding processing, or blow molding processing. Among these, extrusion processing in which a resin is melted and extruded, or injection molding processing in which a molten resin is injected into a mold and molded is preferred. A cylindrical molded article obtained by cylindrically multilayer-extruding a single layer or two or more layers by extrusion processing is preferred in that the ease of attachment such as joining or sealing, and the dimensional precision are good for processing by injection molding, bag making processing, part attachment processing, or the like using a cylindrical molded article.

The cylindrical molded article extruded in this manner is cut to a predetermined length and used. For example, when the cylindrical molded article is used for a packaging container with a plug such as a pouch with a spout including Cheer Pack (R), a barrier plug is molded by insert injection molding or the like using the cylindrical molded article in the present embodiment, and the barrier plug is attached to a bag and a container. The cylindrical molded article at this time is used with a length reaching the interiors of the bag and the container. In addition, when the cylindrical molded article is used for an infusion bag, an insert-injection-molded barrier plug or a tubular cylindrical molded article is attached by performing heat sealing or the like in a state in which it is sandwiched between the inner surfaces of a bag at an end or corner portion of the bag.

[Method for Manufacturing Barrier Plug]

As shown in FIG. 1, a barrier plug 1 in the present embodiment has a spout body 3 to be attached to a container 2 with a barrier plug, and the above cylindrical molded article 4 inserted into the spout body, and the cylindrical molded article forms a discharge flow path 5 for discharging the contents in the above container to the outside. Such a barrier plug 1 can be manufactured, for example, by injection-molding the resin constituting the spout body 3 around the cylindrical molded article 4, though not particularly limited.

Figure 2:
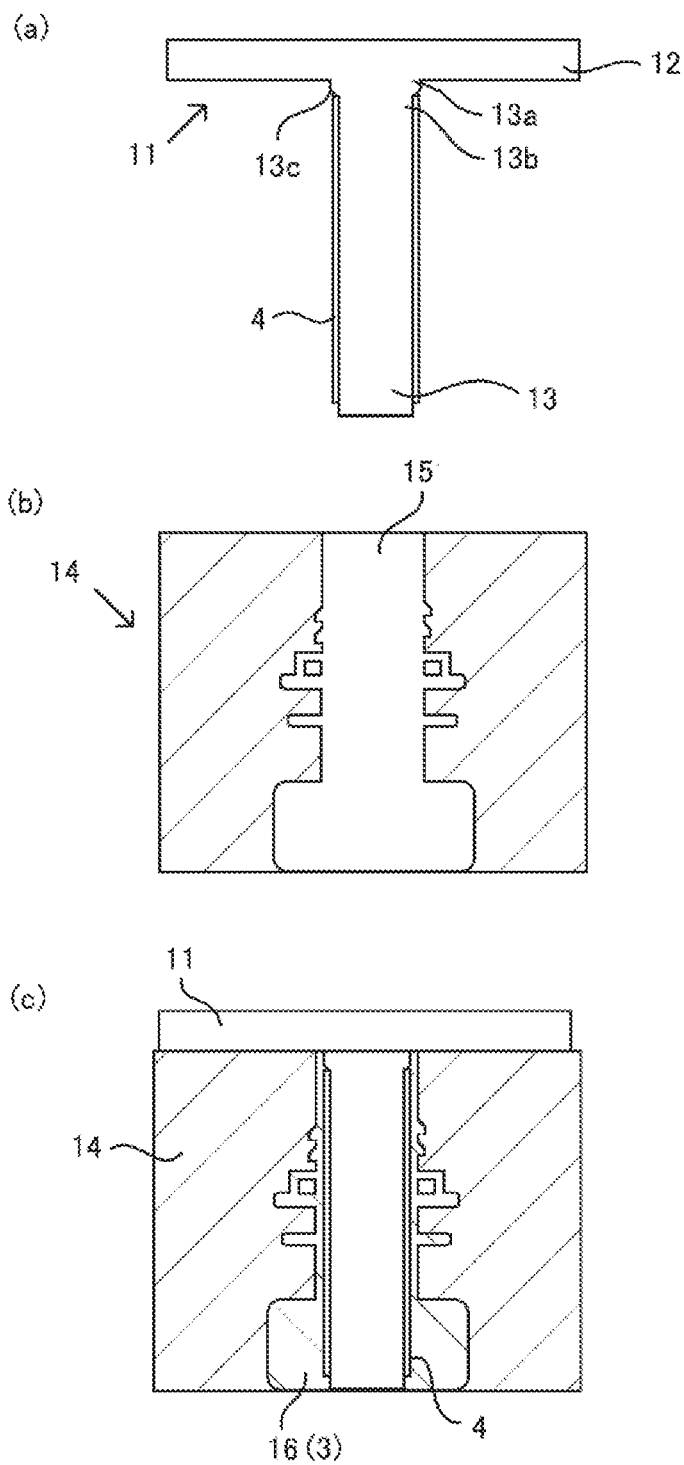
FIG. 2 shows schematic views showing one aspect of a method for manufacturing the barrier plug in the present embodiment.

Injection molding processing will be described below as an example. Schematic views showing one aspect of a method for manufacturing the barrier plug in the present embodiment are shown in FIG. 2. FIG. 2(a) shows a mold core 11 used for injection molding, and a cylindrical molded article attachment portion 13 having a columnar shape is formed on the base 12 of the mold core 11. The cylindrical molded article attachment portion 13 comprises a large diameter portion 13a located on the base end side on the base 12 side of the cylindrical molded article attachment portion 13, a small diameter portion 13b located on the tip side of the cylindrical molded article attachment portion 13, and a covering layer portion 13c formed between the large diameter portion 13a and the small diameter portion 13b. The covering layer portion 13c is stepped toward the tip side of the cylindrical molded article attachment portion 13.

In the present embodiment, the difference between the radii of the large diameter portion 13a and the small diameter portion 13b is approximately equal to the wall thickness of the cylindrical molded article 4, the outer diameter of the large diameter portion 13a is approximately equal to the outer diameter of the cylindrical molded article 4, and the outer diameter of the small diameter portion 13b is formed so as to be slightly smaller than the inner diameter of the cylindrical molded article 4, specifically 0.01 to 0.2 mm smaller. The axial length of the small diameter portion 13b of the cylindrical molded article attachment portion 13 is formed longer than the axial length of the cylindrical molded article 4.

FIG. 2(b) shows a molding mold 14, and the molding mold 14 is formed of a left molding mold and a right molding mold so that it can be divided right and left. A cavity 15 is formed inside the molding mold 14, and the shape of the inner peripheral surface of the molding mold 14 is formed in the same shape as the outer peripheral shape of the spout body. In one right molding mold, a gate communicating with the injection port of an injection molding machine not shown is provided toward the cavity 15. The above-described mold core 11 is configured to be moveable forward and backward so that the cylindrical molded article attachment portion 13 can be vertically brought into and out of the cavity 15 of the molding mold 14.

The barrier plug 1 is molded by an injection molding apparatus having an injection molding machine and a molding mold. As shown in FIG. 2(c), the cylindrical molded article 4 is attached to the cylindrical molded article attachment portion 13 of the mold core 11, and inserted until one end side of the cylindrical molded article 4 abuts the bottom of the covering layer portion 13c. Therefore, the covering layer portion 13c plays a role as the positioning of the cylindrical molded article 4. Then, as shown in FIG. 2(c), the cylindrical molded article attachment portion 13 is inserted into the cavity 15 of the molding mold 14 in a state in which the cylindrical molded article 4 is inserted into the cylindrical molded article attachment portion 13, and the left molding mold and the right molding mold are closed.

Next, as shown in FIG. 2(c), a resin stirred and melted in the injection molding machine is injected into the cavity 15 from the gate. The cylindrical molded article 4 is subjected to the flow pressure of the molten resin, and a load under which the cylindrical molded article 4 tries to move to the large diameter portion 13a side on the base end side of the cylindrical molded article attachment portion 13 is applied, but movement is restricted by the covering layer portion 13c of the cylindrical molded article attachment portion 13. In addition, the covering layer portion 13c restricts the position of the cylindrical molded article 4, and therefore the covering layer portion 13c is formed in the cylindrical molded article attachment portion 13 so that the cylindrical molded article 4 is disposed at a normal position in the spout body.

Figure 3:
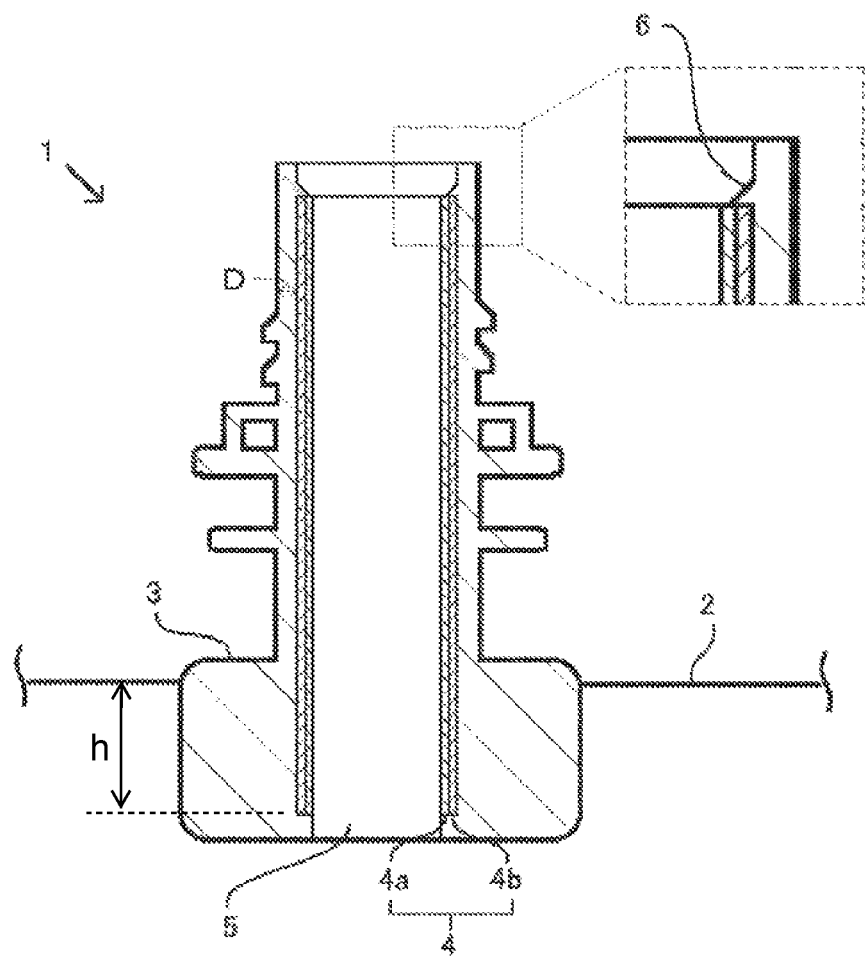
FIG. 3 shows a schematic cross-sectional view showing the barrier plug in the present embodiment.

The space between the molding mold 14 and the cylindrical molded article attachment portion 13 of the mold core 11 is filled with the molten resin by the injection molding machine, and thus the spout body is formed. A stepped clearance is formed between one end side of the cylindrical molded article 4 and the covering layer portion 13c formed in the cylindrical molded article attachment portion 13, the clearance is filled with the molten resin, and thus the covering layer 6 of the spout body is formed (see FIG. 3). The covering layer 6 is formed so that the portion abutting the end surface of the cylindrical molded article 4 on one end side is a restriction surface, and the surface where the covering layer 6 abuts the covering layer portion 13c of the cylindrical molded article attachment portion 13 is a covering layer. On the other end side of the cylindrical molded article 4, its end surface is covered with the molten resin, and a retention surface is formed. Thus, the end surfaces of the cylindrical molded article 4 on one end side and the other end side are covered with the spout body. The spout body comes into contact with the cylindrical molded article 4 in a molten state during molding, and thus the close adhesiveness and adhesiveness between the spout body and the cylindrical molded article 4 are enhanced.

The molten resin 16 is cooled and solidified, and thus the spout body 3 is molded, and the barrier plug 1 is obtained. Even if there is a slight gap between the cylindrical molded article 4 and the small diameter portion 13b of the cylindrical molded article attachment portion 13, the molten resin can be prevented from entering the gap by resin viscosity adjustment or the like.

In addition, from the viewpoint of water vapor barrier properties, oxygen barrier properties, and smell retention properties, in a state in which the barrier plug 1 is attached to the container 2, the container 2 and the cylindrical molded article 4 preferably lap in the longitudinal direction of the cylindrical molded article 4. The length h of the lap in the longitudinal direction is preferably 0.1 mm to 10 mm, more preferably 2 mm to 7 mm. When the length h is 0.1 mm or more, the water vapor barrier properties, the oxygen barrier properties, and the smell retention properties tend to improve more. In addition, when the length h is 10 mm or less, the amount of the relatively expensive cylindrical molded article 4 used can be decreased, and therefore the cost of the barrier plug can be reduced.

Further, from the viewpoint of preventing the spout body 3 from cracking to expose the cylindrical molded article 4, the wall thickness D of the spout body is preferably 0.2 mm to 2 mm, more preferably 0.4 mm to 1.5 mm. Here, in the spout body 3 having a complicated cross-sectional shape, the wall thickness D refers to the thickness of the thinnest portion.

[Container with Barrier Plug]

The container with the barrier plug in the present embodiment has a container and the above barrier plug attached to the container, and the container comprises at least one or more selected from the group consisting of a laminated film having a resin layer composed of a barrier resin having an oxygen transmission rate of 10000 mL·μm/m$^2$·24 hrs·MPa (23° C. and 65% RH) or less and a water vapor transmission rate of 1000 g·μm/m$^2$·24 hrs (38° C. and 90% RH) or less, a laminated film having an aluminum foil layer, and a metal vapor-deposited film.

Examples of the constituent member of the container include at least one or more selected from the group consisting of a laminated film having a resin layer composed of a barrier resin, a laminated film having an aluminum foil layer, and a metal vapor-deposited film.

The resin layer composed of the barrier resin can have the same configuration as described for the above barrier plug except that it has an oxygen transmission rate of 10000 mL·μm/m$^2$·24 hrs·MPa (23° C. and 65% RH) or less and a water vapor transmission rate of 1000 g·μm/m$^2$·24 hrs (38° C. and 90% RH) or less and constitutes the container.

EXAMPLES

The present invention will be specifically described below by Examples and Comparative Examples, but the present invention is not limited by these in any way.

[Fabrication of Substitute Measurement Samples for Measuring Oxygen Transmission Rates, Water Vapor Transmission Rates, and Rates of Decrease in Oxygen Transmission Rates]

In the measurement of the oxygen transmission rates, water vapor transmission rates, and rates of decrease in oxygen transmission rates of cylindrical molded articles, substitute measurement samples imitating the layer structures (types of resins, lamination orders, and thickness ratios of layers) of the cylindrical molded articles were fabricated, and from the measured values of the oxygen transmission rates, water vapor transmission rates, and rates of decrease in oxygen transmission rates of the film samples, the oxygen transmission rates, water vapor transmission rates, and rates of decrease in oxygen transmission rates of the cylindrical molded articles were calculated.

These substitute measurement films were obtained by forming films using a direct inflation apparatus and using a single-layer die for single-layer films and a coextrusion multilayer die for laminated films, so as to provide predetermined configuration ratios. By multiplying the measured values of the oxygen transmission rate, water vapor transmission rate, and rate of decrease in the oxygen transmission rate of a substitute measurement film by the thickness value of the resin layer comprising the barrier resin to provide transmission rates per μm, barrier properties when a cylindrical molded article is formed can be estimated.

[Oxygen Transmission Rate (OTR)]

The oxygen transmission rate (OTR) was measured in accordance with ASTM D-3985. Specifically, a substitute measurement sample having a predetermined thickness was measured under the conditions of 23° C. and 65% RH using Mocon OX-TRAN 2/20. The obtained measured value was multiplied by the thickness of the resin layer comprising the barrier resin to obtain the oxygen transmission rate per thickness of 1 μm (rounded to the nearest whole number).

[Water Vapor Transmission Rate (WVTR)]

The water vapor transmission rate (WVTR) was measured in accordance with ASTM F-372. Specifically, a substitute measurement sample having a predetermined thickness was measured under the conditions of 38° C. and 90% RH using Mocon PERMATRAN-W398. The obtained measured value was multiplied by the thickness of the resin layer comprising the barrier resin to obtain the water vapor transmission rate per thickness of 1 μm (rounded to the nearest whole number).

[Rate of Decrease in Oxygen Transmission Rate]

The rate of decrease in the oxygen transmission rate was measured in accordance with ASTM D-3985. Specifically, a substitute measurement sample having a predetermined thickness was measured under the conditions of 23° C. and 90% RH using Mocon OX-TRAN 2/20. The obtained measured value was multiplied by the thickness of the resin layer comprising the barrier resin to provide the oxygen transmission rate per thickness of 1 μm (rounded to the nearest whole number) under the condition of 90% RH. The rate of decrease in the oxygen transmission rate was obtained by dividing the oxygen transmission rate under the condition of 65% RH by the oxygen transmission rate under the condition of 90% RH (rounding the quotient to the nearest whole number) and multiplying the quotient by 100%.

In Table 1, the oxygen transmission rates (mL·μm/m$^2$·day·MPa), water vapor transmission rates (g·μm/m$^2$·day), and rates of decrease in oxygen transmission rates of cylindrical molded articles are described without parentheses, and the oxygen transmission rates (mL/m$^2$·day·MPa) and water vapor transmission rates (g/m$^2$·day) of substitute measurement samples are described with parentheses.

[Method for Manufacturing Container with Barrier Plug]

Each of the cylindrical molded articles obtained in the Examples and the Comparative Examples was inserted into a spout body composed of polyethylene, and a lid portion was attached to obtain a barrier plug. Each of the resin compositions obtained in the Examples and the Comparative Examples was continuously extruded into a sheet shape using melt extrusion equipment. Then, the extruded resin composition was adjusted to the same thickness as the tube in a cold water tank. The obtained sheet was cut, and the sheet was disposed on a lid portion body composed of polyethylene so as to be the portion of a lid portion covering a mouth of a plug, thereby obtaining the lid portion. The obtained barrier plug to which the lid portion was attached was attached to a pouch composed of a laminated film having an aluminum foil layer to obtain a container with a barrier plug.

[Room Temperature Storage Property Evaluation]

50 mL of soy sauce was placed in each of the containers with the barrier plugs obtained in the Examples and the Comparative Examples, and dark-stored in a constant temperature and humidity tank adjusted to 23° C. and 50% RH for 3 days. The L (lightness), a (green-red hue), and b (blue-yellow hue) of the soy sauce before and after the storage were measured by a color difference meter, and from the Lab value difference, ΔE (color difference)=(ΔL)$^2$+(Δa)$^2$+(Δb)$^2$ was obtained (rounded to the nearest whole number), and the degree of discoloration was observed. A case where ΔE was 0 or more and 7 or less could be evaluated as the soy sauce being in a relatively good state with little discoloration of the soy sauce. A case where ΔE was more than 7 and 12 or less could be evaluated as the soy sauce being in a good state. A case where ΔE was more than 12 and 14 or less could be evaluated as the soy sauce being in a usable state though discoloration being visually recognizable. A case where ΔE was more than 14 could be evaluated as the soy sauce being in an unusable state with extreme discoloration.

[High Temperature and High Humidity Storage Property Evaluation]

50 mL of soy sauce was placed in each of the containers with the barrier plugs obtained in the Examples and the Comparative Examples, and dark-stored in a constant temperature and humidity tank adjusted to 40° C. and 90% RH for 3 days. The L (lightness), a (green-red hue), and b (blue-yellow hue) of the soy sauce before and after the storage were measured by a color difference meter, and from the Lab value difference, ΔE (color difference)=(ΔL)$^2$+(Δa)$^2$+(Δb)$^2$ was obtained (rounded to the nearest whole number), and the degree of discoloration was observed. A case where ΔE was 0 or more and 7 or less could be evaluated as the soy sauce being in a relatively good state with little discoloration of the soy sauce. A case where ΔE was more than 7 and 12 or less could be evaluated as the soy sauce being in a good state. A case where ΔE was more than 12 and 14 or less could be evaluated as the soy sauce being in a usable state though discoloration being visually recognizable. A case where ΔE was more than 14 could be evaluated as the soy sauce being in an unusable state with extreme discoloration.

[Smell Retention Property Evaluation]

The mouth of each of the cylindrical molded articles obtained in the Examples and the Comparative Examples on one side was closed, and 10 mL of ethanol was placed and hermetically sealed. The cylindrical molded article was placed in a 5 L desiccator in a state in which the cylinder side surface was horizontal, and hermetically sealed. After the desiccator was stored at 40° C. for 1 day, the degree of an alcohol smell leaked from the cylindrical molded article into the desiccator was evaluated by the following criteria.

○: There was no alcohol smell at all.
Δ: There was a slight alcohol smell.
×: There was a distinct alcohol smell.

Example 1

A resin composition obtained by mixing 1 wt % of epoxidized soybean oil as a heat stabilizer with a PVDC-A resin with vinylidene chloride (VDC)/methyl acrylate (MA)=95/5 (% by mass) having a weight average molecular weight of 80,000 (manufactured by Asahi Kasei Chemicals Corporation) was continuously extruded cylindrically using melt extrusion equipment equipped with a cylindrical die. Then, the extruded resin composition was adjusted to an outer diameter of 10 mm in a cold water tank with an outer diameter sizing apparatus to obtain a single-layer tube having a thickness of 300 μm. In addition, the same resin composition was adjusted to a thickness of 30 μm, which was 1/10 of the tube thickness, using a direct inflation apparatus, to obtain a single-layer film (substitute measurement film). The oxygen transmission rate and water vapor transmission rate of this substitute measurement film were measured.

Example 2

A single-layer tube having an outer diameter of 10 mm and a thickness of 300 μm was obtained as in Example 1 except that a PVDC-B resin with vinylidene chloride (VDC)/methyl acrylate (MA)=92/8 (% by mass) having a weight average molecular weight of 80,000 (manufactured by Asahi Kasei Chemicals Corporation) was used instead of the PVDC-A resin.

Example 3

A single-layer tube having an outer diameter of 10 mm and a thickness of 300 μm was obtained as in Example 1 except that a PVDC-C resin with vinylidene chloride (VDC)/vinyl chloride (VC)=89/11 (% by mass) having a weight average molecular weight of 80,000 (manufactured by Asahi Kasei Chemicals Corporation) was used instead of the PVIDC-A resin.

Example 4

A single-layer tube having an outer diameter of 10 mm and a thickness of 100 μm was obtained as in Example 1 except that the thickness was 100 μm.

Example 5

A single-layer tube having an outer diameter of 10 mm and a thickness of 500 μm was obtained as in Example 1 except that the thickness was 500 μm.

Example 6

Low density polyethylene (PE-A (manufactured by Asahi Kasei Chemicals Corporation, product name F1920)) and a resin composition obtained by mixing 1 wt % of epoxidized soybean oil as a heat stabilizer with the PVDC-A resin were continuously extruded cylindrically using the low density polyethylene (PE-A) for an inside layer and an outside layer and the resin composition for an intermediate layer and using melt extrusion equipment equipped with a coextrusion multilayer cylindrical die. Then, the extruded material was adjusted to an outer diameter of 10 mm in a cold water tank with an outer diameter sizing apparatus to obtain a three-layer tube having a thickness of 600 μm. In addition, adjustment to a total thickness of 60 μm, which was 1/10 of the tube thickness, was made in the same manner by coextrusion multilayer film molding equipment with the same thickness configuration ratio for the layers to obtain a three-layer film (substitute measurement film). The oxygen transmission rate and water vapor transmission rate of this substitute measurement film were measured.

Example 7

A two-layer tube having an outer diameter of 10 mm and a thickness of 400 μm was obtained as in Example 6 except that the outside layer composed of the low density polyethylene (PE-A) was not provided.

Example 8

A three-layer tube having an outer diameter of 10 mm and a thickness of 500 μm was obtained as in Example 6 except that the PVDC-B resin was used instead of the PVDC-A resin.

Example 9

A two-layer tube having an outer diameter of 10 mm and a thickness of 400 μm was obtained as in Example 7 except that the PVDC-B resin was used instead of the PVDC-A resin.

Example 10

A three-layer tube having an outer diameter of 10 mm and a thickness of 500 μm was obtained as in Example 6 except that the high density polyethylene (PE-B (manufactured by Asahi Kasei Chemicals Corporation, product name F371)) was used instead of the low density polyethylene (PE-A).

Example 11

A two-layer tube having an outer diameter of 10 mm and a thickness of 400 μm was obtained as in Example 7 except that the high density polyethylene (PE-B) was used instead of the low density polyethylene (PE-A).

Example 12

The low density polyethylene (PE-A), an ethylene-vinyl acetate copolymer (EVA-A (manufactured by Nippon Unicar Company Limited, product name NUC3765D)), a resin composition obtained by mixing 1 wt % of epoxidized soybean oil as a heat stabilizer with the PVDC-A resin, the ethylene-vinyl acetate copolymer (EVA-A), and the low density polyethylene (PE-A) were continuously extruded cylindrically in this order from the inside using melt extrusion equipment equipped with a coextrusion multilayer cylindrical die. Then, the extruded material was adjusted to an outer diameter of 10 mm in a cold water tank with an outer diameter sizing apparatus to obtain a five-layer tube having a thickness of 600 μm. In addition, adjustment to a total thickness of 60 μm, which was 1/10 of the tube thickness, was made in the same manner by coextrusion multilayer film molding equipment with the same thickness configuration ratio for the layers to obtain a five-layer film (substitute measurement film). The oxygen transmission rate and water vapor transmission rate of this substitute measurement film were measured.

Example 13

The low density polyethylene (PE-A), the ethylene-vinyl acetate copolymer (EVA-A), and a resin composition obtained by mixing 1 wt % of epoxidized soybean oil as a heat stabilizer with the PVDC-A resin were continuously extruded cylindrically using the low density polyethylene (PE-A) for an inside layer, the ethylene-vinyl acetate copolymer (EVA-A) for an intermediate layer, and the resin composition for an outside layer and using melt extrusion equipment equipped with a coextrusion multilayer cylindrical die. Then, the extruded material was adjusted to an outer diameter of 10 mm in a cold water tank with an outer diameter sizing apparatus to obtain a three-layer tube having a thickness of 400 μm. In addition, adjustment to a total thickness of 40 μm, which was 1/10 of the tube thickness, was made in the same manner by coextrusion multilayer film molding equipment with the same thickness configuration ratio for the layers to obtain a three-layer film (substitute measurement film). The oxygen transmission rate and water vapor transmission rate of this substitute measurement film were measured.

Example 14

A five-layer tube having an outer diameter of 10 mm and a thickness of 600 μm was obtained as in Example 12 except that an ethylene-vinyl acetate copolymer (EVA-B (manufactured by Nippon Unicar Company Limited, product name NUC-3758)) was used instead of the ethylene-vinyl acetate copolymer (EVA-A).

Example 15

A three-layer tube having an outer diameter of 10 mm and a thickness of 400 µm was obtained as in Example 13 except that the ethylene-vinyl acetate copolymer (EVA-B) was used instead of the ethylene-vinyl acetate copolymer (EVA-A).

Example 16

A three-layer tube having an outer diameter of 10 mm and a thickness of 500 µm was obtained as in Example 6 except that homopolypropylene (PP-A (manufactured by SunAllomer Ltd., product name PL500A)) was used instead of the low density polyethylene (PE-A).

Example 17

Adjustment to an outer diameter of 10 mm was made to obtain a two-layer tube having a thickness of 400 µm, as in Example 16 except that the outside layer composed of the homopolypropylene (PP-A) was not provided.

Example 18

The homopolypropylene (PP-A), an adhesive resin, a resin composition obtained by mixing 1 wt % of epoxidized soybean oil as a heat stabilizer with the PVDC-A resin, an adhesive resin, and the homopolypropylene (PP-A) were continuously extruded cylindrically in this order from the inside using melt extrusion equipment equipped with a coextrusion multilayer cylindrical die. Then, the extruded material was adjusted to an outer diameter of 10 mm in a cold water tank with an outer diameter sizing apparatus to obtain a five-layer tube having a thickness of 600 µm. In addition, adjustment to a total thickness of 60 µm, which was ¹⁄₁₀ of the tube thickness, was made in the same manner by coextrusion multilayer film molding equipment with the same thickness configuration ratio for layers to obtain a five-layer film (substitute measurement film). The oxygen transmission rate and water vapor transmission rate of this substitute measurement film were measured.

Example 19

A five-layer tube having an outer diameter of 10 mm and a thickness of 600 µm was obtained as in Example 18 except that random polypropylene (PP-B (manufactured by SunAllomer Ltd., product name PB222A)) was used instead of the homopolypropylene (PP-A).

Example 20

The homopolypropylene (PP-A), an adhesive resin, and a resin composition obtained by mixing 1 wt % of epoxidized soybean oil as a heat stabilizer with the PVDC-A resin were continuously extruded cylindrically using the homopolypropylene (PP-A) for an inside layer, the adhesive resin for an intermediate layer, and the resin composition for an outside layer and using melt extrusion equipment equipped with a coextrusion multilayer cylindrical die. Then, the extruded material was adjusted to an outer diameter of 10 mm in a cold water tank with an outer diameter sizing apparatus to obtain a three-layer tube having a thickness of 450 µm. In addition, adjustment to a total thickness of 45 µm, which was ¹⁄₁₀ of the tube thickness, was made in the same manner by coextrusion multilayer film molding equipment with the same thickness configuration ratio for layers to obtain a three-layer film (substitute measurement film). The oxygen transmission rate and water vapor transmission rate of this substitute measurement film were measured.

Example 21

A five-layer tube having an outer diameter of 10 mm and a thickness of 500 µm was obtained as in Example 12 except that an outside layer composed of an ethylene vinyl alcohol copolymer (EVOH) was provided instead of the outside layer composed of the low density polyethylene (PE-A), and an adhesive resin was used instead of the ethylene-vinyl acetate copolymer (EVA-A) of the inside layer.

Comparative Example 1

A single-layer tube having an outer diameter of 10 mm and a thickness of 150 µm was obtained as in Example 1 except that an ethylene vinyl alcohol copolymer was used instead of the PVDC-A resin, and the thickness was 150 µm. In addition, adjustment to a thickness of 15 µm, which was ¹⁄₁₀ of the tube thickness, was made in the same manner using a melt extrusion machine, to obtain a single-layer film (substitute measurement film). The oxygen transmission rate and water vapor transmission rate of this substitute measurement film were measured.

Comparative Example 2

A single-layer tube having an outer diameter of 10 mm and a thickness of 150 µm was obtained as in Example 1 except that an MXD6 polyamide resin (PA (manufactured by MITSUBISHI GAS CHEMICAL COMPANY, INC., product name S6007)) was used instead of the PVDC-A resin, and the thickness was 150 µm. In addition, adjustment to a thickness of 15 µm, which was ¹⁄₁₀ of the tube thickness, was made in the same manner using a melt extrusion machine, to obtain a single-layer film (substitute measurement film). The oxygen transmission rate and water vapor transmission rate of this substitute measurement film were measured.

Comparative Example 3

The low density polyethylene (PE-A), an adhesive resin, an ethylene vinyl alcohol copolymer (EVOH), an adhesive resin, and the low density polyethylene (PE-A) were continuously extruded cylindrically in this order from the inside using melt extrusion equipment equipped with a coextrusion multilayer cylindrical die. Then, the extruded material was adjusted to an outer diameter of 10 mm in a cold water tank with an outer diameter sizing apparatus to obtain a five-layer tube having a thickness of 450 µm. In addition, adjustment to a total thickness of 45 µm, which was ¹⁄₁₀ of the tube thickness, was made in the same manner by coextrusion multilayer film molding equipment with the same thickness configuration ratio for layers to obtain a five-layer film (substitute measurement film). The oxygen transmission rate and water vapor transmission rate of this substitute measurement film were measured.

Comparative Example 4

Adjustment to an outer diameter of 10 mm was made to obtain a five-layer tube having a thickness of 500 µm, as in Comparative Example 3 except that 150 μm of an intermediate layer composed of the MXD6 polyamide resin (PA) was used instead of 100 μm of the intermediate layer composed of the ethylene vinyl alcohol copolymer (EVOH).

TABLE 1

| | Cylindrical molded article configuration (cylinder inside ← → outside) | | | | | Oxygen transmission rate (23° C. · 65% RH) | Water vapor transmission rate (38° C. · 90% RH) | Rate of decrease in oxygen transmission rate % | Room temperature storage test soy sauce Lab ΔE | High temperature and high humidity storage test soy sauce Lab ΔE | Smell retention properties |
|---|---|---|---|---|---|---|---|---|---|---|---|
| Example 1 | PVDC-A (300 μm) | — | — | — | — | 210 (0.7) | 20 (0.1) | 99 | 7 | 8 | ○ |
| Example 2 | PVDC-B (300 μm) | — | — | — | — | 400 (1.3) | 30 (0.1) | 99 | 9 | 10 | ○ |
| Example 3 | PVDC-C (300 μm) | — | — | — | — | 600 (2.0) | 40 (0.1) | 98 | 10 | 11 | ○ |
| Example 4 | PVDC-A (100 μm) | — | — | — | — | 210 (2.1) | 20 (0.2) | 99 | 9 | 10 | ○ |
| Example 5 | PVDC-A (500 μm) | — | — | — | — | 200 (0.4) | 20 (0.04) | 99 | 2 | 2 | ○ |
| Example 6 | PE-A (150 μm) | PVDC-A (300 μm) | PE-A (150 μm) | — | — | 210 (0.7) | 20 (0.1) | 99 | 7 | 8 | ○ |
| Example 7 | PE-A (100 μm) | PVDC-A (300 μm) | — | — | — | 210 (0.7) | 20 (0.1) | 98 | 7 | 8 | ○ |
| Example 8 | PE-A (100 μm) | PVDC-B (300 μm) | PE-A (100 μm) | — | — | 400 (20) | 40 (2) | 98 | 9 | 10 | ○ |
| Example 9 | PE-A (100 μm) | PVDC-B (300 μm) | — | — | — | 400 (20) | 40 (2) | 99 | 9 | 10 | ○ |
| Example 10 | PE-B (100 μm) | PVDC-A (300 μm) | PE-B (100 μm) | — | — | 210 (0.7) | 20 (0.1) | 99 | 7 | 8 | ○ |
| Example 11 | PE-B (100 μm) | PVDC-A (300 μm) | — | — | — | 210 (0.7) | 20 (0.1) | 99 | 7 | 8 | ○ |
| Example 12 | PE-A (100 μm) | EVA-A (50 μm) | PVDC-A (300 μm) | EVA-A (50 μm) | PE-A (100 μm) | 210 (0.7) | 20 (0.1) | 99 | 7 | 8 | ○ |
| Example 13 | PE-A (70 μm) | EVA-A (30 μm) | PVDC-A (300 μm) | — | — | 210 (0.7) | 20 (0.1) | 99 | 7 | 8 | ○ |
| Example 14 | PE-A (100 μm) | EVA-B (50 μm) | PVDC-A (300 μm) | EVA-B (50 μm) | PE-A (100 μm) | 210 (0.7) | 20 (0.1) | 99 | 7 | 8 | ○ |
| Example 15 | PE-A (70 μm) | EVA-B (30 μm) | PVDC-A (300 μm) | — | — | 210 (0.7) | 20 (0.1) | 99 | 7 | 8 | ○ |
| Example 16 | PP-A (100 μm) | PVDC-A (300 μm) | PP-A (100 μm) | — | — | 210 (0.7) | 20 (0.1) | 99 | 7 | 8 | ○ |
| Example 17 | PP-A (100 μm) | PVDC-A (300 μm) | — | — | — | 210 (0.7) | 20 (0.1) | 99 | 7 | 8 | ○ |
| Example 18 | PP-A (120 μm) | Adhesive resin (30 μm) | PVDC-A (300 μm) | Adhesive resin (30 μm) | PP-A (120 μm) | 210 (0.7) | 20 (0.1) | 99 | 7 | 8 | ○ |
| Example 19 | PP-B (120 μm) | Adhesive resin (30 μm) | PVDC-A (300 μm) | Adhesive resin (30 μm) | PP-B (120 μm) | 210 (0.7) | 20 (0.1) | 99 | 7 | 8 | ○ |
| Example 20 | PP-A (120 μm) | Adhesive resin (30 μm) | PVDC-A (300 μm) | — | — | 210 (0.7) | 20 (0.1) | 99 | 7 | 8 | ○ |
| Example 21 | PE-A (70 μm) | EVA-A (30 μm) | PVDC-A (300 μm) | Adhesive resin (30 μm) | EVOH (70 μm) | 160 (0.4) | 18 (0.5) | 98 | 5 | 6 | ○ |

TABLE 1-continued

| | Cylindrical molded article configuration (cylinder inside ⟵⟶ outside) | | | | | Oxygen transmission rate (23° C. · 65% RH) | Water vapor transmission rate (38° C. · 90% RH) | Rate of decrease in oxygen transmission rate % | Room temperature storage test soy sauce Lab ΔE | High temperature and high humidity storage test soy sauce Lab ΔE | Smell retention properties |
|---|---|---|---|---|---|---|---|---|---|---|---|
| Comparative Example 1 | EVOH (150 μm) | — | — | — | — | 150 (1) | 1125 (7.5) | 70 | 18 | 23 | x |
| Comparative Example 2 | PA (150 μm) | — | — | — | — | 1500 (10) | 7000 (47) | 75 | 19 | 23 | x |
| Comparative Example 3 | PE-A (120 μm) | Adhesive resin (30 μm) | EVOH (150 μm) | Adhesive resin (30 μm) | PE-A (120 μm) | 150 (1) | 1050 (7.0) | 70 | 16 | 22 | x |
| Comparative Example 4 | PP-A (120 μm) | Adhesive resin (30 μm) | PA (150 μm) | Adhesive resin (30 μm) | PP-A (120 μm) | 1500 (10) | 6000 (40) | 78 | 18 | 23 | x |

From Examples 1 to 21, it is found that when the oxygen transmission rates and the water vapor transmission rates are within the ranges of the present invention, the evaluation of the storage properties of the cylindrical molded articles is good. It is found that when a resin having better barrier properties is used as in Examples 1 and 5, the storage properties of the cylindrical molded articles are better. From Examples 1 to 21, it is found that the oxygen transmission rates and water vapor transmission rates of the vinylidene chloride copolymers are good whether they are used for single-layer tubes or films or multilayer tubes or films, and the evaluation of the storage properties of the cylindrical molded articles is also good. It is found that when the oxygen transmission rates and the water vapor transmission rates are outside the ranges of the present invention as in Comparative Examples 1 to 4, cylindrical molded articles satisfying storage properties are not obtained.

The barrier plug of the present invention has industrial applicability as a plug used for various packagings.

The invention claimed is:

1. A barrier plug comprising a spout body to be attached to a container, and a cylindrical molded article inserted into the spout body, wherein
    the cylindrical molded article comprises a resin layer comprising a barrier resin,
    an oxygen transmission rate of the resin layer is 10000 mL·μm/m$^2$·24 hrs·MPa (23° C. and 65% RH) or less,
    a rate of decrease in the oxygen transmission rate of the resin layer is 80 to 100% at 23° C. and 65% RH compared to 23° C. and 90% RH,
    a water vapor transmission rate of the resin layer is 1000 g·μm/m$^2$·24 hrs (38° C. and 90% RH) or less, and
    the cylindrical molded article forms a discharge flow path for discharging contents in the container to an outside.

2. The barrier plug according to claim 1, wherein the spout body comprises a polyolefin-based resin.

3. The barrier plug according to claim 1, wherein a melting point of the barrier resin is higher than a melting point of a resin constituting the spout body.

4. The barrier plug according to claim 1, wherein the spout body has a layer covering at least part of an end surface of the cylindrical molded article at an end opposite to an end to be attached to the container, and
    the covering layer covers an end surface of the resin layer comprising the barrier resin.

5. The barrier plug according to claim 1, wherein the barrier resin comprises a vinylidene chloride copolymer or an ethylene-vinyl alcohol copolymer.

6. The barrier plug according to claim 1, wherein the cylindrical molded article comprises an inside layer and an outside layer,
    the inside layer comprises a polyolefin-based resin, and
    the outside layer is the resin layer.

7. The barrier plug according to claim 1, wherein the cylindrical molded article comprises an inside layer, one or more intermediate layers, and an outside layer,
    the inside layer comprises a polyolefin-based resin, and
    the outside layer and/or the intermediate layer are the resin layer.

8. A container with a barrier plug, comprising a container and the barrier plug according to claim 1 attached to the container, wherein
    the container comprises at least one or more selected from the group consisting of a laminated film having a resin layer composed of a barrier resin having an oxygen transmission rate of 10000 mL·μm/m$^2$·24 hrs·MPa (23° C. and 65% RH) or less and a water vapor transmission rate of 1000 g·μm/m$^2$·24 hrs (38° C. and 90% RH) or less, a laminated film having an aluminum foil layer, and a metal vapor-deposited film.

* * * * *